United States Patent [19]
Work et al.

[11] Patent Number: 5,911,923
[45] Date of Patent: Jun. 15, 1999

[54] METHOD FOR MICROENCAPSULATING WATER-SOLUBLE OR WATER-DISPERSIBLE OR WATER-SENSITIVE MATERIALS IN AN ORGANIC CONTINUOUS PHASE

[75] Inventors: Dale E. Work, London; Ronald L. Hart, Xenia; David R. Virgallito, Beavercreek, all of Ohio

[73] Assignee: Microtek Laboratories, Inc., Dayton, Ohio

[21] Appl. No.: 08/878,428

[22] Filed: Jun. 18, 1997

Related U.S. Application Data

[60] Provisional application No. 60/020,958, Jul. 1, 1996.

[51] Int. Cl.$^6$ ............................. B01J 13/18; B01J 13/08
[52] U.S. Cl. ............. 264/4.7; 427/213.36; 427/213.34
[58] Field of Search ................. 264/4.7; 427/213.36, 427/213.34

[56] References Cited

U.S. PATENT DOCUMENTS

| | | | |
|---|---|---|---|
| 3,886,085 | 5/1975 | Kiritani et al. | 252/316 |
| 4,110,511 | 8/1978 | Lee et al. | 428/307 |
| 4,157,983 | 6/1979 | Golden | 252/316 |
| 4,308,165 | 12/1981 | Vassiliades et al. | 252/316 |
| 4,463,156 | 7/1984 | McGary, Jr. et al. | 528/65 |
| 4,506,734 | 3/1985 | Nolte | 166/308 |
| 4,532,183 | 7/1985 | Shackle et al. | 428/402.22 |
| 4,534,783 | 8/1985 | Beestman | 264/4 |
| 4,708,812 | 11/1987 | Hatfield | 252/70 |
| 4,741,401 | 5/1988 | Walles et al. | 166/300 |
| 4,780,321 | 10/1988 | Levy et al. | 424/499 |
| 4,783,502 | 11/1988 | Faler et al. | 524/871 |
| 4,900,551 | 2/1990 | Ohtsubo et al. | 424/408 |
| 4,919,209 | 4/1990 | King | 166/300 |
| 5,007,481 | 4/1991 | Williams et al. | 166/300 |
| 5,102,558 | 4/1992 | McDougall et al. | 252/8.551 |
| 5,102,559 | 4/1992 | McDougall et al. | 252/8.551 |
| 5,103,905 | 4/1992 | Brannon et al. | 166/250 |
| 5,110,486 | 5/1992 | Manalastas et al. | 252/8.551 |
| 5,164,099 | 11/1992 | Gupta et al. | 252/8.551 |
| 5,204,183 | 4/1993 | McDougall et al. | 428/402.24 |
| 5,217,074 | 6/1993 | McDouglall et al. | 166/300 |
| 5,225,278 | 7/1993 | Kielbania, Jr. et al. | 428/402.22 |
| 5,231,117 | 7/1993 | Seitz | 523/16 |
| 5,325,921 | 7/1994 | Johnson et al. | 166/280 |
| 5,370,184 | 12/1994 | McDougall et al. | 166/278 |
| 5,373,901 | 12/1994 | Norman et al. | 166/300 |
| 5,386,874 | 2/1995 | Laramay et al. | 166/300 |
| 5,420,174 | 5/1995 | Dewprashad | 523/130 |
| 5,433,953 | 7/1995 | Tsuei et al. | 424/489 |
| 5,437,331 | 8/1995 | Gupta et al. | 166/300 |
| 5,441,109 | 8/1995 | Gupta et al. | 166/300 |
| 5,622,656 | 4/1997 | Huc et al. | 264/4.7 |
| 5,760,128 | 6/1998 | Baltus et al. | 524/591 |

OTHER PUBLICATIONS (Mati) Matsumoto Yushi Seiya Ku KK, WPIDS AN 91–019501, abstracting JP02293041, Dec. 1990.

A. Nurhan Becidyan, *A New Phosphorescent Pigment*, p. 106., Feb. 1997.

*Primary Examiner*—Jeffrey C. Mullis
*Attorney, Agent, or Firm*—Thompson Hine & Flory LLP

[57] ABSTRACT

A method for microencapsulating a water-soluble or water-dispersible or water-sensitive material comprising dispersing the water-soluble or water-dispersible or water-sensitive material in an organic continuous phase and adding a polyfunctional isocyanate, a diol or polyol in the presence of an optional polymerization catalyst to the organic continuous phase is described.

35 Claims, No Drawings

METHOD FOR MICROENCAPSULATING WATER-SOLUBLE OR WATER-DISPERSIBLE OR WATER-SENSITIVE MATERIALS IN AN ORGANIC CONTINUOUS PHASE

This application claims priority from U.S. Provisional Application No. 60/020,958, filed Jul. 1, 1996.

BACKGROUND OF THE INVENTION

This invention relates to a method for microencapsulating water-soluble or water-dispersible or water-sensitive materials in an organic continuous phase by urethane coacervation. The method is useful for the microencapsulation of a variety of materials, e.g., fluorescent and phosphorescent pigments, and is particularly useful for the microencapsulation of breaker materials used to break fracturing fluids employed in the stimulation of subterranean formations.

The use of capsules to mask, protect, stabilize, delay and control the release of various materials is well known and, in particular, the use of such capsules or microcapsules to encapsulate breaker materials has been described in, e.g., U.S. Pat. Nos. 4,741,401 to Walker et al; 4,919,209 to King; 5,110,486 to Manalastar et al; 5,102,558; 5,102,559; 5,204,183 and 5,370,184 all to McDougall et al; 5,164,099 and 5,437,331 to Gupta et al; and 5,373,901 to Norman et al.

Typically, the encapsulated breaker material is formed by surrounding the breaker material with an enclosure member which is sufficiently permeable to at least one fluid, generally water, found in a subterranean formation being treated or to a fluid injected with the capsule into the formation and which is capable of releasing the breaker. Generally the breaker is coated or encapsulated by spraying small particles of the material with a suitable coating formulation in a fluidized bed or by suspension polymerization wherein the breaker particles are suspended in a liquid-liquid system containing a monomer which is capable of polymerizing to form a polymeric coating surrounding the breaker particle.

Although the foregoing methods appear to provide satisfactory encapsulated materials, it remains desirable to provide an alternative method which is more economical and which gives equivalent or superior performance.

SUMMARY OF THE INVENTION

In accordance with the present invention, a method is described wherein a water-soluble or water-dispersible or water-sensitive material is microencapsulated by a polyurethane product obtained by the polymerization reaction between a polyfunctional isocyanate and a diol or polyol.

Formation of the polyurethane microcapsules in accordance with the present invention involves urethane coacervation resulting from the polymerization of an isocyanate and a diol or polyol which comprises: dispersing a water-soluble or water-dispersible or water-sensitive solid or liquid material in an organic continuous phase; adding a polyfunctional isocyanate to the dispersion; adding a diol or polyol to the dispersion; and optionally adding, to the dispersion, a polymerization catalyst for copolymerizing the polyfunctional isocyanate and the diol or polyol. As the molecular weight of the polyurethane increases, it reaches a point where the polyurethane separates out of the solution, forming a film at the suspended core particle or droplet/organic interface and eventually microencapsulating the water-soluble or water-dispersible or water-sensitive material. The reaction may be conducted at elevated temperatures, at ambient temperatures, or even below ambient temperatures.

DETAILED DESCRIPTION OF THE INVENTION

The coacervation method of the present invention involves a number of individual steps, however, a person skilled in the art would recognize that such steps are not necessarily required to be performed in any particular order. For example, the optional catalyst is typically added to the diol or polyol, but it may be added in a different step or manner.

The resulting polyurethane-wall microcapsules containing the water-soluble or water-dispersible or water-sensitive material can be recovered in a conventional manner as recognized by those persons skilled in the art.

In the present invention the continuous phase is an organic medium containing one or a combination of non-aqueous hydrophobic materials. Typically, the organic medium includes aliphatic hydrocarbons such as Norpar, a mixture of n-paraffin having about 5 to 30 or more carbon atoms available from Exxon, and Isopar, a mixture of branched paraffins having about 8 to 30 or more carbon atoms available from Exxon, aromatic hydrocarbons, vegetable oils, mineral oils, organic esters such as aliphatic, aromatic or fatty acid esters of carboxylic acids, e.g., ethyl acetate, and mixtures thereof. In one aspect of the invention, the organic medium is a mixture of toluene, ethyl acetate and soybean oil. The composition of the mixture is not critical, however good results have been obtained with a mixture containing about 75 to 80 wt % toluene, about 5 to 10 wt % ethyl acetate, and about 15 to 20 wt % soybean oil. Those skilled in the art will recognize that one or more nonaqueous mediums and other weight combinations can be used, such as kerosene, ligroin, Petroleum distillates, e.g., naphtha; etc; and mixtures with other organic materials provided that they are not reactive with the isocyanate.

The material to be encapsulated in accordance with the present invention can be any liquid or solid material which is dispersible in the oil or nonaqueous medium. The method is useful in encapsulating materials that are water-soluble or water-dispersible or sensitive to water. The present invention is particularly useful for encapsulating breaker materials which are employed to break fracturing fluids utilized in the stimulation of subterranean formations such as oil-and/or gas-containing formations. A fracturing process used in a well-treating operation involves the introduction into the well of a fluid under sufficient hydraulic pressure to produce or enlarge fractures in the subterranean formation. The fracturing fluid usually contains a propping agent such as sand, sintered alumina, glass beads, aluminum spacers, urea pills or nutshells, wherein the propping agent is deposited within the fracture in order to maintain the fracture in an open mode, alternatively, an acid is contained within the fracturing fluid wherein the acid reacts with acid reactable components of the subterranean formation thereby creating and enlarging the fracture so that one obtains increased flow of fluids from the subterranean formation. The propping agent is suspended within a polymeric gel or a highly viscous polymeric solution. After the highly viscous fluid has been pumped into the fracture and the fracture is formed or enlarged, it is desirable that the highly viscous fluid be converted into a low viscosity fluid so that the fluid can be removed from the fracture thereby leaving the propping agent within the fracture. The removal of the fluid is necessary so that the oil or gas can flow back through the fracture into the well bore. The conversion of the highly viscous solution into the lower viscosity fluid is called breaking the gel. The breaking of the gel is accomplished by adding a breaker chemical to the gel at the appropriate time. It is critical that the breaking process does not prematurely occur prior to the completion of the fracturing process. Premature breaking can decrease the number of fractures obtained and thus, the amount of hydrocarbon recovery.

Representative examples of breaker materials which can be advantageously encapsulated in accordance with this invention include alkali metal or alkaline earth perchlorates; alkali metal or alkaline earth metal persulfates, such as potassium persulfate and sodium persulfate; ammonium persulfate; sodium chlorite; ammonium bifluoride; ammonium fluoride; sodium fluoride; potassium fluoride, ammonium sulfate; sodium acetate; potassium acetate; calcium oxide; calcium hydroxide; sodium bicarbonate; transition metal salts, particularly in the ionized form such as $FeCl_3$, $AgNO_3$, $CuSO_4$, and the like; acids such as mineral acid, e.g., HCl, or organic acids such as citric acid, enzymes, and mixture thereof.

The present invention is also useful for encapsulating solid fluorescent, electrofluorescent, and particularly phosphorescent pigments. Phosphorescent pigments are typically defined as organic or inorganic materials which absorb energy and then continue to release a portion of that energy as, e.g., light for a period of time up to several hours or even days after the exciting energy has been removed or discontinued.

It is known that most, if not all, phosphorescent pigments are water-sensitive and that their efficiency is greatly diminished in the presence of water. A growing interest in phosphorescent pigments in certain industries such as printing and silk screening has encouraged the need to develop ways in which the phosphorescent pigments can be used in the presence of an aqueous environment. The microencapsulation of phosphorescent pigments in accordance with the invention provides stability, particularly moisture stability, to such phosphorescent pigments allowing them to be employed in the presence of an aqueous environment without diminishing the efficiency of the phosphorescent pigments.

In accordance with the invention a wide variety of phosphorescent pigments may be encapsulated to provide stability to the phosphorescent pigment against moisture. Representative examples of phosphorescent pigments useful in the invention include CaS, ZnS, ZnSe, $Zn_2SiO_4$, $BaTiO_3$, $TiO_2$, BN, ZnO, CdS, AlN, GaSb, GaAr, GaP, InP, InSb, SiC, Si, Ge, aluminum oxide, Europeum oxide or ytterbium oxide and the like and combination thereof. Typically, the phosphorescent pigment contains an activator such as copper, manganese, or one or more rare earth metals. Particularly effective phosphorescent pigments include CaS, ZnS, aluminum oxide or mixtures thereof.

The material to be encapsulated may be a solid which is water-soluble or water-dispersible or water-sensitive or it may be a liquid material which is insoluble in the organic medium. In general, if the material is a solid, it will have a particle size of about 1 to 1500 microns, preferably about 1 to 500 microns. If the material is a liquid, the size of the droplets dispersed in the organic medium should be in the range of about 1 to 1000 microns, preferably about 5 to 500 microns.

With respect to breaker materials, the capsules may contain up to about 95% or more of the breaker material, preferably, about 75% to 95% by weight breaker.

Representative isocyanates useful in the present invention include aromatic and alicyclic diisocyanates or mixtures thereof which have the desired solubility in the organic medium such as 1,4-phenylene diisocyanate, 4,4-diphenyl methane diisocyanate (MDI), toluene diisocyanate (TDI), isophorone diisocyanate (IPDI), methylenebis(4-cyclohexyl isocyanate) (HMDI), and the like. In addition to the aforementioned diisocyanates, the invention can also be practiced using one or more aromatic and cycloaliphatic polyisocyanates such as triisocyanates and tetraisocyanates. In a preferred aspect of the invention, the isocyanate is 1,4-phenylene diisocyanate or a toluene diisocyante adduct of trimethylolpropane available from bayer under the tradename Desmodur CB-75N. The amount of isocyanate required in the present invention is stoichiometric with respect to the diol or polyol and should be present in the reaction in sufficient amount to provide an effective wall around the breaker material or other internal phase. Generally, the isocyanate will be present in an amount of about 2 to 20% and, preferably, about 5 to 15% based on the weight of the internal phase material.

Representative examples of diols useful in the present invention include straight or branched chain diols having two to six carbon atoms in the main chain which exhibit the desired solubility in the organic medium, e.g., ethylene glycol, propylene glycol, 1,4-butanediol, neopentyl glycol; or a alicyclic glycol having up to 10 carbon atoms, e.g., 1,4-cyclohexanediol, 1,4-dimethylol cyclohexane, etc. Other diols useful in the present invention include polyester diols such as poly(ethylene adipate) glycol, poly(ethylene succinate) glycol, poly(ethylene sebacate) glycol, poly (butylene adipate) glycol, poly(ethylene butylene adipate) glycol, poly(diethylene ether adipate) glycol, etc.; and polyether diols such as poly(tetramethylene ether) glycol. In addition to the aforementioned diols, polyols having three or more hydroxy groups on the molecule such as trimethylolethane, trimethylolpropane, pentaerythritol, and adducts of polyols such as PCP-0300, an adduct of trimethylolpropane and epsilon-caprolactone available from Union Carbon, can be employed in the present invention. The amount of diol useful in this invention depends on the amount of isocyanate employed and is generally employed in an equivalent stoichiometric ratio of about 1 equivalent of diol or polyol to about 1.2 equivalents of isocyanate. The excess amount of isocyanate is usually used because of the presence of extraneous moisture.

The formation of the microcapsule may be accomplished with or without a catalyst; however, it is preferred to form the microcapsule in the presence of an effective catalyst because of the more efficient reaction conditions. The catalyst used in the practice of the present invention can be any of the catalysts commonly used to catalyze the polymerization reaction between a polyfunctional isocyanate and a diol or polyol to form polyurethane. Typical catalysts useful in the invention are those which are soluble in the organic medium, and include triethylene diamines and metal salts of organic acids, e.g., dibutyl tin dilaurate. A particularly effective catalyst for preparing the polyurethanes of the present invention is 1,4-diazabicyclo [2.2.2] octane (DABCO). Typically, the amount of catalyst employed to effectively achieve the encapsulated product of this invention is about 0.01 to 1.0 wt. %, preferably, about 0.05 to 0.5 wt. % based on the isocyanate and diol or polyol reactants.

Each of the isocyanate, the diol or polyol and the catalyst can be added to the dispersion neat or as a solution. For example, the isocyanate is typically a viscous material which is more conveniently added as a solution in a solvent which is compatible with the organic medium and with the other additives. The amount of isocyanate, diol or polyol, or catalyst in solution can be easily determined by a skilled practitioner and is generally dependent upon the total amount of the specific ingredient necessary to complete the polymerization reaction. The solvent may be a single solvent or a mixture of solvents. Typically, the solvent is one or more of the same solvents used in the organic medium employed as the continuous phase.

As discussed above, the reaction can be carried out at elevated temperatures, at ambient temperatures or even below ambient depending on the reactivity of the reaction components, particularly the isocyanate, and whether or not a catalyst is used and, if so, the nature of the catalyst. Typically, the reaction is carried out at about ambient to about 100° C. In a preferred aspect of the invention the reaction is conducted in the range from ambient to about 35° C. for a period of about 1 to 6 hours, longer or shorter times may be employed depending upon reaction conditions employed, amount and effectiveness of the catalyst, and the reactivity of the diol or polyol with respect to the isocyanate.

As is typical with microencapsulation processes, the amounts and types of reaction components, the composition of the organic medium, process conditions and parameters such as temperature, reaction time and modes of additions of reactants may be adjusted or optimized depending upon the desired properties of the microcapsules. Exceptional control of shelf-life stability and functionality of the microcapsules can be achieved by adjustments of these materials and process parameters. Because microcapsule walls produced by this method can be relatively impervious, it is necessary in those applications that require a controlled release of encapsulated material to balance stability and release properties.

Generally, the encapsulated material is prepared having a membrane coating of a certain thickness to obtain the desired capsule stability and release profile. Overall capsule quality is usually enhanced by increasing the wall thickness. This is achieved by adding more of the urethane components and/or less of the material to be encapsulated. Uniformity and geometry of the encapsulated material if it is a solid also is a significant factor to consider in defining the capsule wall thickness. Those skilled in the art will recognize that the presence of fines, poor particle uniformity and shape, that is, non-spherical particles, usually lead to poor capsule quality. The present encapsulation method surprisingly is quite tolerable of these deficiencies, for example, breaker materials and phosphorescent pigments of very poor particle geometry and particle size distribution have been microencapsulated quite effectively.

The encapsulated material produced by the present method when placed in an aqueous environment, for example, encapsulated gel breaker, is released from within the coating membrane by diffusion. The aqueous fluid or fracturing fluid, in the case of the breaker, permeates the capsule membrane, dissolves or partially dissolves the core particle and diffuses outward to chemically react with and to subsequently break the fracturing fluid.

Microencapsulated breakers prepared by this invention typically have very low initial release of breaker in a high temperature aqueous environment followed by a later rapid release. This aspect of the invention is desirable in applications in fracturing fluids because it allows more effective fractures and thus enhance well productivity. For example, at 160° F., microcapsules have exhibited 10% or less release of breaker at 2 hours exposure and 50% or greater release after 4 hours exposure in deionized water.

While the following example is meant to illustrate the method of the invention, the particular materials, amounts of materials, conditions and the order of addition should not be construed to unduly limit the invention.

EXAMPLE

In a particularly preferred embodiment of the present invention, potassium persulfate is microencapsulated in accordance with the following steps:

(A) 60 grams of potassium persulfate (50 to 500 $\mu$m) is dispersed in an organic medium containing 100 mL toluene, 10 mL ethyl acetate, and 20 grams soybean oil at room temperature;

(B) 5 grams of a toluene diisocyanate adduct of trimethylolpropane available from Bayer under the trade name Desmodur CB-75N is dissolved in 5 grams of ethyl acetate and added to the dispersion and stirred for one-half hour;

(C) additional solution of Desmodur CB-75N (5 grams) in ethyl acetate (5 grams) is added gradually by dripping over a period of 20 minutes;

(D) a solution of 0.05 grams 1,4-diazabicyclo [2.2.2] octane (DABCO) catalyst and 0.4 grams ethylene glycol in 5 grams ethyl acetate is gradually added to the dispersion over 20 minutes. The dispersion is stirred for 30 minutes as the polyurethane begins to coat the particles with a capsule wall;

(E) Step (D) is repeated to provide additional wall buildup;

(F) the dispersion is then heated to 35° C. and held at this temperature for 2 to 3 hours;

(G) the microencapsulated potassium persulfate particles are isolated by decanting and washed with 80 mL toluene. The encapsulated particles are washed a second time, filtered, and rinsed with 35 mL toluene;

(H) the encapsulated particles are bench dried; and (I) the microcapsules (66 grams) are recovered.

The recovered microcapsules exhibit excellent retention of the water-soluble potassium persulfate salts when dispersed in water at 71° C.

Having described the invention above including the preferred embodiment thereof, it will be obvious to those skilled in the art that variations are possible and any such variations are considered to be within the scope of the appended claims.

What is claimed is:

1. A method for microencapsulating a water-soluble or water-dispersible or water-sensitive material comprising dispersing said water-soluble or water-dispersible or water-sensitive material in an organic continuous phase and adding a polyfunctional isocyanate and a diol or polyol to the organic continuous phase, wherein said method is carried out in the absence of an aqueous phase and said polyfunctional isocyanate and said diol or polyol react in said organic continuous phase to form a polyurethane film which encapsulates said water-soluble or water-dispersible or water-sensitive material.

2. The method of claim 1 wherein said method is carried out at a temperature of ambient to about 100° C.

3. The method of claim 1 wherein said encapsulated water-soluble or water-dispersible or water-sensitive material, when placed in an aqueous environment, is released from the coating membrane by diffusion.

4. The method of claim 1 wherein said method further comprises adding a polymerization catalyst to said dispersion.

5. The method of claim 2 wherein each of said polyfunctional isocyanate, said diol or polyol, and said catalyst is added to said dispersion in a solvent compatible with said organic phase.

6. The method of claim 5 wherein said diol or polyol and said catalyst are added to said dispersion together in said solvent.

7. The method of claim 5 wherein said solvent is ethyl acetate.

8. The method of claim 4 wherein said polymerization catalyst is 1,4-diazobicyclo [2.2.2] octane.

9. The method of claim 1 wherein said organic continuous phase is selected from the group consisting of aliphatic hydrocarbons, aromatic hydrocarbons, kerosene, petroleum distillates, ligroin, vegetable oils, mineral oils, esters, and mixtures thereof.

10. A method of claim 9 wherein said organic continuous phase is a mixture of toluene, ethyl acetate and soybean oil.

11. The method of claim 1 wherein said isocyanate is an aromatic diisocyanate, an aliphatic diisocyanate, an aromatic polyisocyanate, an aliphatic polyisocyanate, or mixtures thereof.

12. The method of claim 11 wherein said isocyanate is selected from the group consisting of 1,4-phenylene diisocyanate, 4,4-diphenyl methane diisocyanate, toluene diisocyanate, toluene diisocyanate adduct of trimethylolpropane, isophorone diisocyanate, methylenebis (4-cyclohexyl isocyanate), and mixtures thereof.

13. The method of claim 12 wherein said isocyanate is a toluene diisocyanate adduct of trimethylolpropane.

14. The method of claim 1 wherein said diol or polyol is an aliphatic diol, polyester diols, polyether diols, polyols, adducts of polyols, or mixtures thereof.

15. The method of claim 14 wherein said diol or polyol is selected from the group consisting of ethylene glycol, propylene glycol, 1,4-butanediol, neopentyl glycol, 1,4-cyclohexanediol, 1,4-dimethylol cyclohexane, poly (ethylene adipate) glycol, poly(ethylene succinate) glycol, poly(ethylene sebacate) glycol, poly(butylene adipate) glycol, poly(ethylene butylene adipate) glycol, poly(diethylene ether adipate) glycol, poly(tetramethylene ether) glycol, trimethylolethane, trimethylolpropane, pentaerythritol, adduct of trimethylolpropane and epsilon-caprolactone, and mixtures thereof.

16. The method of claim 15 wherein said diol or polyol is ethylene glycol.

17. The method of claim 1 wherein said water-soluble or water-dispersible or water-sensitive material is a breaker material.

18. The method of claim 17 wherein said breaker material is selected from the group consisting of alkali metal perchlorates, alkaline earth metal perchlorates, alkali metal persulfates, alkaline earth persulfates, alkali metal perborates, alkaline earth metal perborates, ammonium persulfate, sodium chlorite, ammonium bifluoride, ammonium fluoride, sodium fluoride, potassium fluoride, ammonium sulfate, sodium acetate, potassium acetate, calcium oxide, calcium peroxide, calcium hydroxide, sodium bicarbonate, ionized transition metal salts, mineral acids, organic acids, enzymes, and mixtures thereof.

19. The method of claim 18 wherein said breaker material is potassium persulfate.

20. The method of claim 1 wherein said water-soluble or water-dispersible or water-sensitive material is a fluorescent, electrofluorescent, or phosphorescent pigment.

21. The method of claim 20 wherein said water-soluble or water-dispersible or water-sensitive material is a phosphorescent pigment.

22. The method of claim 21 wherein said phosphorescent pigment is CaS, ZnS, aluminum oxide, or mixtures thereof.

23. A method for microencapsulating a breaker material used to break fracturing fluids in the stimulation of subterranean formations, said method comprising:

dispersing said breaker material in an organic medium to form a dispersion;

adding a polyfunctional isocyanate to said dispersion;

adding a diol or polyol to said dispersion;

adding a polymerization catalyst to said dispersion;

heating said dispersion up to about 35° C. for a time sufficient to form microencapsulated particles of said breaker material, wherein said method is carried out in the absence of an aqueous phase and said polyfunctional isocyanate and said diol or polyol react in said continuous phase to form a polyurethane film which encapsulates said water-soluble or water-dispersible or water-sensitive material.

24. The method of claim 23 wherein said encapsulated breaker material, when placed in an aqueous environment, is released from the coating membrane by diffusion.

25. The method of claim 23 wherein said breaker material is selected from the group consisting of alkali metal perchlorates, alkaline earth metal perchlorates, alkali metal alkaline earth metal persulfates, alkali metal perborates alkaline earth metal perborates, ammonium persulfate, sodium chlorite, ammonium bifluoride, ammonium fluoride, sodium fluoride, potassium fluoride, ammonium sulfate, sodium acetate, potassium acetate, calcium oxide, calcium peroxide, calcium hydroxide, sodium bicarbonate, ionized transition metal salts, mineral acids, organic acids, enzymes, and mixtures thereof.

26. The method of claim 25 wherein said breaker material is potassium persulfate.

27. The method of claim 26 wherein each of said polyfunctional isocyanate, said diol or polyol, and said catalyst is added to said dispersion in a solvent compatible with said organic phase.

28. The method of claim 27 wherein said diol or polyol and said catalyst are added to said dispersion together in said solvent.

29. The method of claim 28 wherein said solvent is ethyl acetate.

30. The method of claim 23 wherein said breaker material is a solid material.

31. The method of claim 1 wherein said water-soluble or water-dispersible or water-sensitive material is a solid material.

32. The method of claim 23 wherein said organic medium is a mixture of toluene, ethyl acetate and soybean oil.

33. The method of claim 23 wherein said polyfunctional isocyanate is a toluene diisocyanate adduct of trimethylolpropane.

34. The method of claim 23 wherein said diol or polyol is ethylene glycol.

35. The method of claim 23 wherein said polymerization catalyst is 1,4-diazobicyclo [2.2.2] octane.

* * * * *

UNITED STATES PATENT AND TRADEMARK OFFICE
CERTIFICATE OF CORRECTION

PATENT NO. : 5,911,923
DATED : June 15, 1999
INVENTOR(S) : Work, et al

It is certified that error appears in the above-indentified patent and that said Letters Patent is hereby corrected as shown below:

Col. 6, line 64 (claim 5), "method of claim 2" should be --method of claim 4--.

Col. 7, line 7 (claim 8), "[2.2.2]" should be --[2.2.2.]--.

Col. 8, line 59 (claim 35) "[2.2.2]" should be --[2.2.2.]--.

Signed and Sealed this

Twelfth Day of October, 1999

Attest:

Q. TODD DICKINSON

Attesting Officer

Acting Commissioner of Patents and Trademarks